United States Patent [19]

Spainhour et al.

[11] Patent Number: 5,301,110
[45] Date of Patent: Apr. 5, 1994

[54] IMPROVEMENTS IN THE METHOD AND APPARATUS FOR EVALUATING THE TOOT (TOE OUT ON TURNS) OF STEERABLE WHEELS WHILE SAID STEERABLE WHEELS ARE BEING ALIGNED

[75] Inventors: Phillip A. Spainhour; Ying T. Lee, both of Nashville, Tenn.

[73] Assignee: Ammco Tools Technology, Corp., Wilmington, Del.

[21] Appl. No.: 734,239

[22] Filed: Jul. 22, 1991

[51] Int. Cl.$^5$ .................. G01B 7/30; G01B 13/195
[52] U.S. Cl. ................. 364/424.01; 364/551.01; 364/424.05; 33/203.18; 33/645
[58] Field of Search ............. 364/424.05, 424.01, 364/203.18, 551.01; 33/228, 288, 600, 645

[56] References Cited

U.S. PATENT DOCUMENTS

| | | | |
|---|---|---|---|
| 4,261,108 | 4/1981 | Davis | 33/288 |
| 4,338,027 | 6/1982 | Eck | 33/288 |
| 4,416,065 | 11/1983 | Hunter | 33/180 |
| 4,600,205 | 6/1986 | Stewart et al. | 280/95 R |
| 4,835,714 | 5/1989 | Sano et al. | 364/424.01 |
| 4,898,464 | 2/1990 | Thorne et al. | 33/288 |
| 4,918,821 | 4/1990 | Bjork | 33/203.18 |
| 5,143,400 | 9/1992 | Miller et al. | 280/661 |
| 5,165,179 | 11/1992 | Schoeninger | 33/600 |

Primary Examiner—Thomas G. Black
Assistant Examiner—Tan Q. Nguyen
Attorney, Agent, or Firm—Patnaude, Videbeck & Marsh

[57] ABSTRACT

The change in the toe of the steerable wheels of a vehicle when the inside wheel is turned through an angle of twenty degrees is determined by turning the inside wheel through an angle of ten degrees, measuring the change in toe which resulted, and multiplying the measurement by four.

7 Claims, 2 Drawing Sheets

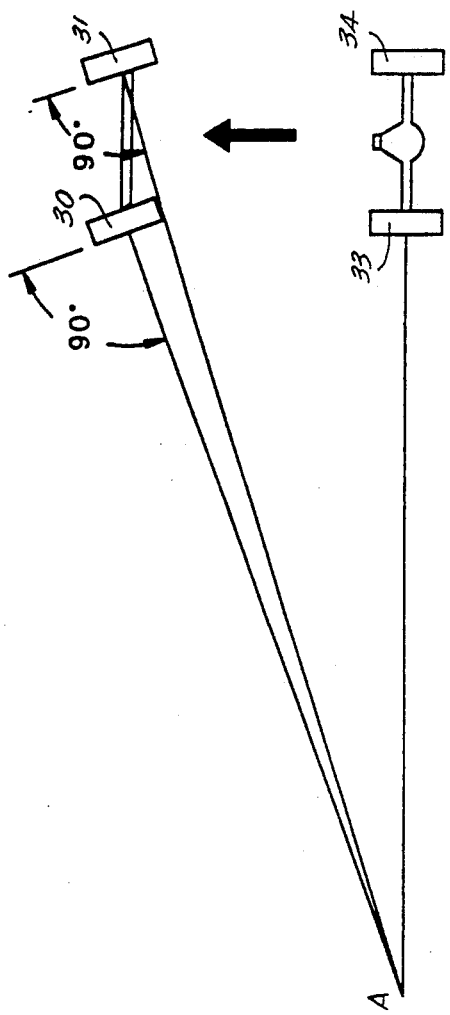
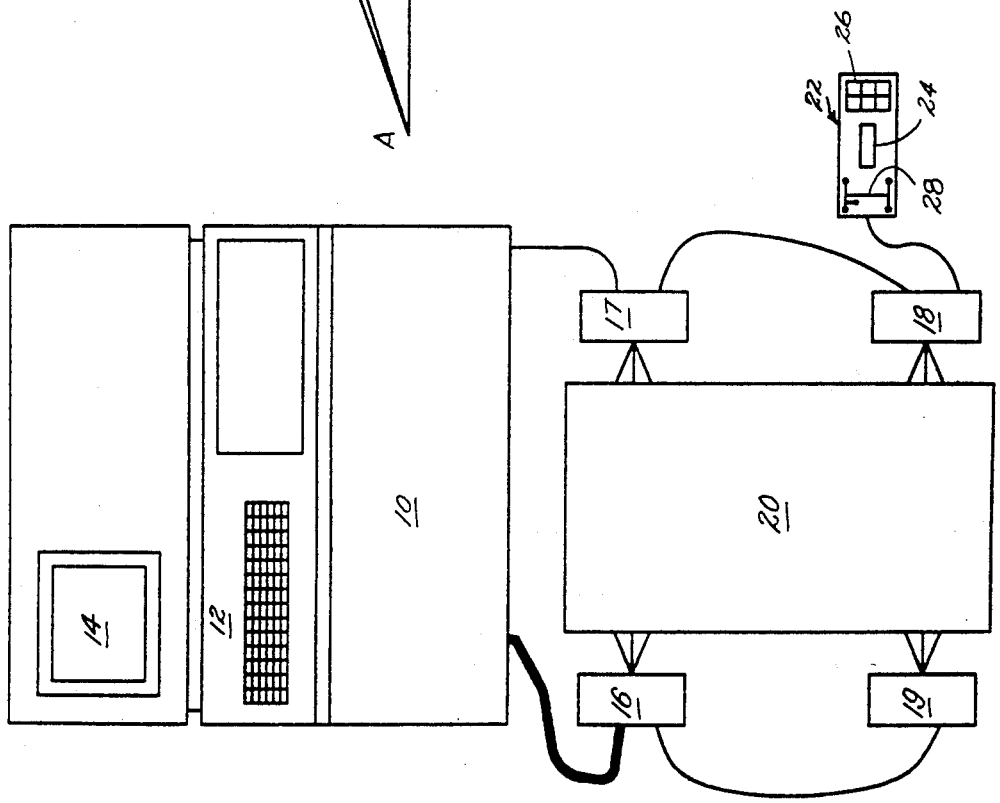
FIG. 2
FIG. 1

IMPROVEMENTS IN THE METHOD AND APPARATUS FOR EVALUATING THE TOOT (TOE OUT ON TURNS) OF STEERABLE WHEELS WHILE SAID STEERABLE WHEELS ARE BEING ALIGNED

The present invention relates in general to a method and apparatus for measuring the change in toe of the steerable wheels of a vehicle when the wheels are turned, and it relates more particularly to a new and improved method and apparatus which measures the change in toe which results from turning the wheels through a first predetermined angle while actually turning the wheels through a second predetermined angle.

BACKGROUND OF THE INVENTION

The most common wheel suspension geometry for the steerable wheels of a vehicle is an Ackerman wherein the axes of rotation of the steerable wheels at all times intersect with one another along the axis of rotation of the non-steerable wheels. As the wheels are turned, the outer wheel must turn at a lesser angle than the inner wheel to prevent scuffing of the wheels as the vehicle makes a turn. In an Ackerman system turning of the steerable wheels results in an increase in toe out. Determining the toe-out-on-turns is one of the measurements which must be made during a typical wheel alignment operation and has been difficult even with the development of sophisticated electronic instruments. Indeed, the most advanced computerized wheel alignment systems require that the technician manually record the steering angles from the wheel turntables, record the toe at two or more different angles of the steerable wheels, and then calculate the change in toe between the two wheel positions. The TOOT angles can be measured directly with the use of electronic turntables, but at a high initial cost, the use of complex parts, and additional maintenance problems.

The manufacturers of automotive vehicles provide specifications for various alignment parameters such as camber, caster, steering axis inclination, and toe as well as TOOT. While the calculations for TOOT are given at a steering angle of twenty degrees, the specifications for caster and steering axis inclination are taken at ten degrees. As a consequence, the steerable wheels have had to be turned from the straight ahead position through precisely ten degrees to determine caster and steering axis inclination and then turned another ten degrees to determine TOOT. While time could be saved if the caster, steering axis inclination, and TOOT parameters were specified at the same steering angles, this has not been the case, and as a result, the normal wheel alignment procedure takes longer than would otherwise be the case.

SUMMARY OF THE INVENTION

Briefly, there is provided in accordance with the present invention the method of measuring the toe angles of the steerable wheels of a vehicle at the same angles at which the caster and steering axis inclination measurements are made and then using these two toe angle measurements to calculate the TOOT at the specified angle. We have found that the TOOT of an Ackerman wheel geometry measured at a turn of ten degrees is one-fourth the TOOT measured at a turn angle of twenty degrees within two percent. Therefore, where the TOOT is specified at twenty degrees, the TOOT can be measured at a turn angle of ten degrees and then multiplied by four to provide the TOOT at twenty degrees. Consequently, the wheels need only be turned from the straight ahead position to ten degrees in order to make the necessary measurements for determining caster, steering axis inclination, and TOOT.

GENERAL DESCRIPTION OF THE DRAWING

A better and more complete understanding of the present invention may be had from a reading of the following detailed description taken in connection with the accompanying drawings wherein:

FIG. 1 is a schematic diagram showing parts of a wheel alignment system used in the measurement of the TOOT of the steerable wheels of a vehicle in accordance with the present invention;

FIG. 2 is a diagram showing the layout of the wheels of a vehicle in an Ackerman type system;

DETAILED DESCRIPTION OF A PREFERRED EMBODIMENT

Figure 5:
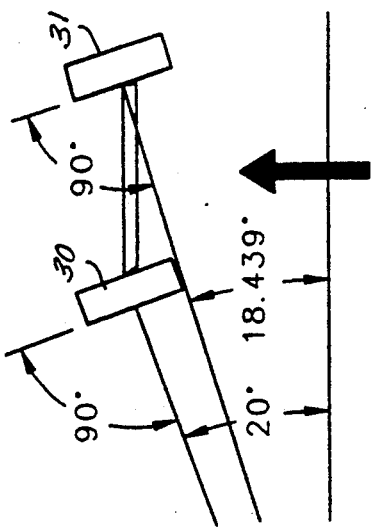
FIG. 5 is a diagram of the wheels of a vehicle with the inside steerable wheel turned through twenty degrees from the straight ahead direction.

Referring to FIG. 1 of the drawing, a computer base unit 10 is connected to a conventional keyboard 12 and to a conventional video display 14. Four sensor heads 16, 17, 18, and 19 are respectively mounted to the four wheels of a vehicle 20 and are connected to the base unit by a plurality of cables. A portable remote control and readout unit 22 is connected by cables to the sensor heads and to the computer base unit. The manner in which this wheel alignment system is used to measure certain ones of the wheel parameters including TOOT is described in detail hereinafter.

The computer in the base unit 10 runs software which processes the data coming from the sensor heads 16, 17, 18, and 19 into meaningful numbers which are displayed on the display 14 or on the display 24 in the remote unit 22. The keyboard 12 and a keyboard 26 in the remote unit 22 are used by the technician to select the operations to be performed by the computer.

The base unit 10, the keyboard 12, and the video display 14 are preferably located in proximity to the front of the vehicle under test so as to be readily accessible to the technician making the wheel alignment measurements and to permit observation of the video display 14 by the technician.

The keyboard 12 may be laid out in a standard I.B.M. format and is used by the technician to enter instructions and certain data, such as the name and model of the vehicle under test, into the computer. The keyboard 26 in the remote unit 22 may be a standard membrane switch having six keys. A pictograph 28 includes four LEDs respectively located at the locations of the four wheels of the vehicle under test to identify for the technician the particular wheel to which the information being shown on the display 24 pertains. A similar pictograph is unnecessary at the base unit since the screen of the display 14 is sufficiently large that such information is displayed directly on the screen of the video display 14.

Referring to FIG. 2, there is shown an Ackerman type wheel geometry for a vehicle having one set of steerable wheels 30 and 31 and one set of non-steerable wheels set to track along the central longitudinal axis of the vehicle. The non-steerable wheels are identified by the reference numbers 33 and 34. It may be seen that the axes of rotation of all four wheels of the vehicle intersect at a common point A. When the steerable wheels 30 and 31 are in the straight ahead positions, the axes of rotation thereof are coaxial and intersect with the common axis of rotation of the non-steerable wheels 33 and 34 at infinity. The wheels may have a small amount of toe-in or toe-out however, these angles are so small as to have a negligible affect on the change in Toot when the vehicle is going around a corner. If the axes of rotation of the front and rear wheels always intersect at the common point A, there is no appreciable side slip of the steerable wheels. As a result there is an increase in tire life and a greater cornering force. Since a tire has a finite amount of traction, this finite amount of traction can either be used for braking against slippage or for generating cornering force. If the tire were being forced sideways during a turn the tire will resist slipping, but the amount of cornering force would be needlessly reduced.

The steerable wheels 30 and 31 do not remain parallel when the wheels are turned, as these wheels turn about the common point A, the outer steerable wheel 31 turns less than the inner steerable wheel 30 resulting in an increase in the toe-out of the steerable wheels as the turn angle is increased. This is called TOOT.

Figure 3:
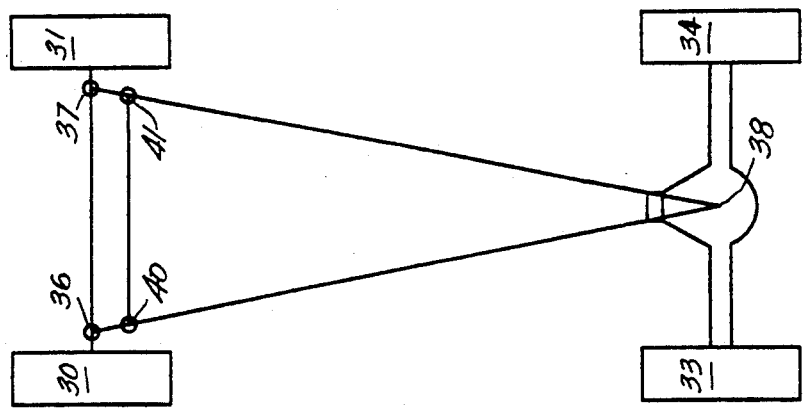
FIG. 3 is another diagram of the wheel layout of a vehicle using the Ackerman geometry.

TOOT is generally expressed in degrees and is determined by the geometry of the steering linkage of the steerable wheels. This geometry is illustrated in FIG. 3. The points about which the steerable wheels orbit as they are turned from the straight ahead position are known in the art as the steering axis points and are identified by the numbers 36 and 37. It can be seen that if imaginary straight lines are drawn from the steering axis points 36 and 37 to a point 38 midway between the non-steerable wheels 33 and 34 and an imaginary straight line is drawn parallel to the axes of rotation of the steerable wheels 30 and 31 when these wheel are in the straight ahead position. These imaginary lines intersect at points 40 and 41 which are the locations where the tie rod ends. The control arms of the steering linkage respectively extend between the steering axis point 37 and the point 40 and between the steering axis point 37 and the point 41. The points 40 and 41 are sometimes located forward of the steering axis points.

Inasmuch as the TOOT angle is generally specified for a turn angle of twenty degrees of the inside wheel on a turn, and the caster and steering axis inclination is generally calculated at ten degrees, it was decided to determine if there is any common relationship between the TOOT of most present day automotive vehicles when measured at twenty degrees and when measured at ten degrees. Using a CAD system and widely available design data for wheelbase and track of present day automotive vehicles, large and small, using an Ackerman steering linkage geometry, we found that in all cases the ratio of TOOT measured at twenty degrees of turn to TOOT measured at ten degrees was four with an error less than two percent (2%). If caster and steering axis inclination specifications or TOOT were specified at other angles the ratio would, of course, be different but would still be a single number.

Figure 4:
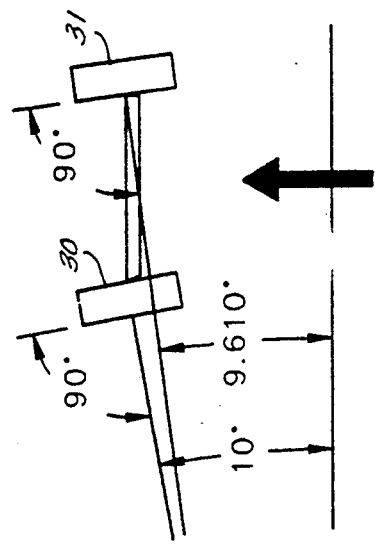
FIG. 4 is diagram of the wheels of a vehicle with the inside steerable wheel turned through ten degrees from the straight ahead direction.

FIG. 4 shows for a particular steerable wheel geometry the difference in the angle of turn of the steerable wheels 30 and 31 with respect to the axis of rotation of the non-steerable wheels 33 and 34 when the inside wheel 30 is turned through ten degrees, and FIG. 5 shows the difference in the angle of turn of the steerable wheels 30 and 31 with respect to the axis of rotation of the non-steerable wheels 33 and 34 when the inside wheel 30 is turned through twenty degrees. As shown in FIG. 4, at a turn angle of ten degrees the TOOT is the difference between 10 degrees and 9.610 degrees or 0.390. As shown in FIG. 5, at a turn angle of twenty degrees the TOOT is the difference between 20 degrees and 18.439 degrees or 1.561 degrees. It will be seen that the ratio of TOOT measured at twenty degrees and TOOT measured at ten degrees is approximately four. As stated hereinabove, this ratio holds true for all present day wheel geometries which use either the Ackerman principal or use a modified Ackerman system wherein a slight change has been made in a true Ackerman for handling considerations.

Operation

In order to measure the TOOT of the steerable wheels under test, the sensors 16 and 17 are mounted to the steerable wheels 30 and 31 and the keyboard 12 is used to enter into the computer the make, year and model of the vehicle. Then either the keyboard 12 or the keypad 26 is used to enter into the computer the fact that the TOOT measuring step is to be performed. Instructions to be followed by the operator will then appear on the screens 12 and 24. The wheels 30 and 31 are then placed in a straight ahead position and the keyboard or keypad actuated to record the value of toe. The wheel 16 is then turned exactly 10 degrees in a counterclockwise direction as viewed from above and the angle of turn of the wheel 17 as well that of the wheel 16 are entered into the computer by actuating of the keyboard 12 or the keypad 26. The computer then calculates the change in toe from the straight ahead positions of the wheels 30 and 31, multiplies that number by four, and displays the result on either the screen of the display 14 or on the screen 24 or on both displays. Also, the computer may be programmed to display the difference, if any, of the measured TOOT and the specified value. The operation is then repeated by rotating the wheel 31 exactly ten degrees in a clockwise direction and recording the values of toe at the new wheel positions. TOOT for the latter turn angles are then calculated by the computer and displayed.

While the present invention has been described in connection with a preferred embodiment, it will be understood that those skilled in the art may make many changes and modifications which fall within the true spirit and scope of the invention. Therefore, it is intended by the appended claims to cover all such changes and modifications which come within the true spirit and scope of the present invention.

What is claimed:

1. A method of determining the TOOT of Ackerman type steerable wheels of a vehicle when the inside one of the steerable wheels of the vehicle is turned through a first predetermined angle, comprising the steps of positioning said steerable wheels in a straight ahead position, measuring and recording the difference between the toe of the steerable wheels when said steerable wheels are in the straight ahead positions, turning the steerable wheels to a second position wherein one of said steerable wheels is at a second predetermined angle relative to the straight ahead positions of said steerable wheels, measuring and recording the difference between the toe of the steerable wheels of said vehicle when said steerable wheels are in said second position, subtracting the first measurement from the second measurement and multiplying the result by a constant to provide the value of TOOT at said first predetermined angle.

2. The method according to claim 1, wherein said first predetermined angle is twenty degrees from the straight ahead position, said second predetermined angle is ten degrees from the straight ahead position, and said constant is about four.

3. A method according to claim 2, comprising the additional step of displaying the result of multiplying said TOOT measured at ten degrees of turn by about four.

4. In the method of determining the alignment of Ackerman type steerable wheels of an automobile, the improvement comprising the steps of:

positioning said steerable wheels in a straight ahead position, measuring and recording the difference between the toe of the steerable wheels of said vehicle when said steerable wheels are in the straight ahead positions, turning the steerable wheels to a second position wherein one of said steerable wheels is at an angle of about 10 degrees relative to the straight ahead positions of said steerable wheels, measuring caster when said steerable wheels are in said second position, measuring and recording the difference between the toe of the steerable wheels of said vehicle when said steerable wheels are in said second position, subtracting the first measurement of the difference between the toe from the second measurement of the difference between the toe and multiplying the result by a constant to provide the value of TOOT when said one of said steerable wheels is at an angle of about 20 degrees relative to the straight ahead position of the steerable wheels.

5. In the method of claim 4, further including the steps of:

measuring steering axis inclination when said steerable wheels are in said second position.

6. In the method of claim 4 further including the step of:

displaying said value of TOOT when said one of said steerable wheels is at an angle of about 20 degrees.

7. In the method of determining the alignment of Ackerman type steerable wheels of an automobile the improvement comprising the steps of:

positioning said steerable wheels in a straight ahead position, measuring and recording the difference between the toe of the steerable wheels of said vehicle when said steerable wheels are in the straight ahead positions, turning the steerable wheels to a second position wherein one of said steerable wheels is at a second predetermined angle relative to the straight ahead positions of said steerable wheels, measuring and recording the difference between the toe of the steerable wheels of said vehicle when said steerable wheels are in said second position, subtracting the first measurement of the difference between the toe from the second measurement of the difference between the toe and multiplying the result by a constant to provide the value of TOOT when said one of said steerable wheels is at a third predetermined angle relative to the straight ahead position of the steerable wheels.

* * * * *